(12) United States Patent
Engh-Halstvedt et al.

(10) Patent No.: US 9,753,735 B2
(45) Date of Patent: Sep. 5, 2017

(54) THREAD ISSUE CONTROL

(71) Applicant: ARM Limited, Cambridge (GB)

(72) Inventors: Andreas Due Engh-Halstvedt, Trondheim (NO); Ian Victor Devereux, Cambridge (GB); David Bermingham, Cambridge (GB); Jakob Axel Fries, Malmo (SE); Oskar Lars Flordal, Lund (SE)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/596,948

(22) Filed: Jan. 14, 2015

(65) Prior Publication Data
US 2015/0227376 A1    Aug. 13, 2015

(30) Foreign Application Priority Data
Feb. 10, 2014 (GB) .................. 1402259.4

(51) Int. Cl.
*G06F 9/38*      (2006.01)
*G06F 12/08*     (2016.01)
*G06F 12/0855*   (2016.01)

(52) U.S. Cl.
CPC .......... *G06F 9/3869* (2013.01); *G06F 9/3816* (2013.01); *G06F 12/0855* (2013.01); *G06F 9/38* (2013.01); *G06F 9/3855* (2013.01); *G06F 9/3867* (2013.01); *G06F 2212/455* (2013.01)

(58) Field of Classification Search
CPC ........ G06F 9/38; G06F 9/3867; G06F 9/3869; G06F 9/3855
See application file for complete search history.

(56) References Cited

U.S. PATENT DOCUMENTS

| | | |
|---|---|---|
| 2002/0055964 A1 | 5/2002 | Luk et al. |
| 2004/0128489 A1 | 7/2004 | Wang et al. |
| 2004/0148491 A1 | 7/2004 | Damron |
| 2009/0199170 A1 | 8/2009 | Arimilli et al. |
| 2011/0219381 A1* | 9/2011 | Ahn ................ G06F 12/08 718/104 |
| 2011/0231612 A1 | 9/2011 | Karlsson et al. |
| 2011/0296431 A1 | 12/2011 | Gschwind et al. |

(Continued)

OTHER PUBLICATIONS

GB Search Report for GB No. 1402259.4, dated Jul. 15, 2014, 3 pages.

*Primary Examiner* — Ann J Lo
*Assistant Examiner* — Masud Khan
(74) *Attorney, Agent, or Firm* — Nixon & Vanderhye P.C.

(57) ABSTRACT

A data processing system includes a processing pipeline for the parallel execution of a plurality of threads. An issue controller issues threads to the processing pipeline. A stall manager controls the stalling and unstalling of threads when a cache miss occurs within a cache memory. The issue controller issues the threads to the processing pipeline in accordance with both a main sequence and a pilot sequence. The pilot sequence is followed such that threads within the pilot sequence are issued at least a given time ahead of their neighbors within a main sequence. The given time corresponds approximately to the latency associated with a cache miss. The threads may be arranged in groups corresponding to blocks of pixels for processing within a graphics processing unit.

19 Claims, 5 Drawing Sheets

(56) References Cited

U.S. PATENT DOCUMENTS

Figure 1:
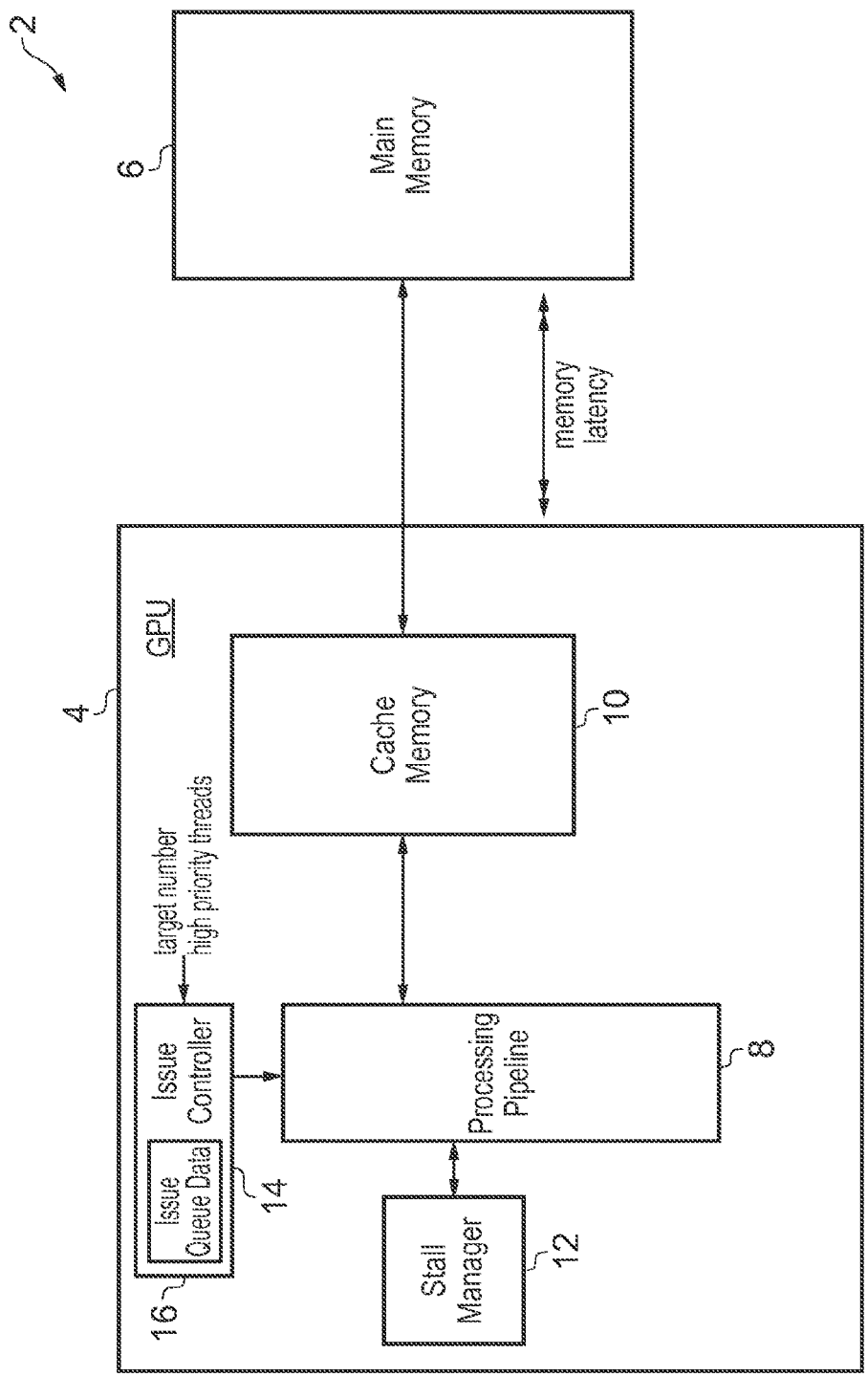

| | | | | |
|---|---|---|---|---|
| 2014/0082625 A1* | 3/2014 | Busaba | ............... | G06F 9/38 |
| | | | | 718/104 |
| 2014/0201508 A1* | 7/2014 | Busaba | ............... | G06F 9/38 |
| | | | | 712/239 |
| 2014/0285500 A1* | 9/2014 | Lindholm | ............ | G06F 9/38 |
| | | | | 345/506 |

* cited by examiner

Interleaved
Main Sequence
(Pilot Sequence Threads
are omitted)

Pilot Sequence
Diagonal

Pilot Sequence Eight Queen

No cluster share a row, column or diagonal

THREAD ISSUE CONTROL

This application is claims priority to GB Application No. 1402259.4, filed 10 Feb. 2014, the entire content of which is hereby incorporated by reference.

BACKGROUND

Field

The present technique relates to the field of data processing systems. More particularly, it relates to the control of thread issue into a processing pipeline within a data processing system.

Description

It is known to provide data processing systems having processing pipelines which can execute a plurality of threads in parallel. As an example, the threads may correspond to different fragments of an image to be generated within a graphics processing system. The use of deep pipelines supporting multiple threads in parallel execution enables a high level of data throughput to be achieved.

One problem associated with such systems is the latency associated with fetching from main memory data required to be accessed during processing. It is known to provide cache memories close to the processing pipeline in order to provide rapid and low energy access to data to be processed. However, data needs to be moved between the cache memory and the main memory as the cache memory has insufficient capacity to hold all of the data which may be required. When a thread makes an access to a data value which is not held within the cache memory, then a cache miss arises and the cache line containing that data value is fetched from the main memory. The time taken to service such a cache miss may be many hundreds of clock cycles and the thread which triggered the cache miss is stalled (parked) during such a miss until the required data is returned. It is known to provide data processing pipelines with the ability to manage stored threads in this way and still make forward progress with threads which are not stalled.

In order that the system should operate efficiently, it is desirable that the capacity to deal with stalled threads should not be exceeded. Conversely, the overhead associated with managing stalled threads is not insignificant and accordingly it is undesirable to provide an excess of this capacity. Furthermore, it is desirable that not too much of the processing capabilities of the processing pipeline should be stalled at any given time as a consequence of threads awaiting data for which a cache miss has occurred.

SUMMARY

An apparatus for processing data comprises:
a processing pipeline configured to execute in parallel a plurality of threads within a predetermined logical sequence of threads to be executed; and
an issue controller configured to issue threads to said processing pipeline for execution;
wherein said issue controller is configured to select threads from said predetermined logical sequence for issue in accordance with both:
  (i) a pilot sequence being a proper subset of said predetermined logical sequence; and
  (ii) a main sequence trailing said pilot sequence through said predetermined logical sequence by a delay time and comprising those threads of said predetermined logical sequence not within said pilot sequence.

The present technique recognises that the threads to be processed will have a predetermined logical sequence in which the program or upstream hardware will order them as becoming eligible for issue to the processing pipeline. Conventionally the threads are then issued in this predetermined logical sequence. This predetermined logical sequence is not speculative as it is known that the threads concerned are to be executed as the program or hardware has committed these threads for execution. The present technique recognises that the predetermined logical order may result in inefficiencies in the utilisation of the processing pipeline and the system as a whole.

In some embodiments, threads issued in the predetermined logical order may correspond to data accesses which are proximal to each other within the memory address space and accordingly result in a bunching of the cache misses to arise. When a large number of cache misses arise together, then the forward progress made by the processing pipeline slows as a relatively large number of threads are simultaneously stalled awaiting return of the data values for which a cache miss occurred. During such times, the cache memory and the processing pipeline are relatively idle and relatively little forward progress is made in the processing. The present technique recognises this behaviour and provides a system in which the predetermined logical sequence is modified to form both a pilot sequence and a main sequence.

The pilot sequence is formed of threads issued to the processing pipeline ahead of neighbouring threads within the predetermined logical sequence which form part of the main sequence. In some example embodiments, the pilot sequence threads are issued at a time greater than the memory latency for a cache miss ahead of their neighbouring threads within the main sequence such that if the thread within the pilot sequence triggers a cache miss, then there is high likelihood that the surrounding data values which may be required by neighbouring threads within the main sequence will have been returned to the cache memory by the time those threads within the main sequence are issued into the processing pipeline. It is expected that the pilot threads will result in a higher proportion of cache misses than the main threads, but that the cache line fills which result from the pilot threads will enable the main threads to more likely proceed without cache misses and associated stalling. The delay time could in other embodiments be less than the latency associated with a cache miss and still give an advantage by at least reducing the waiting for data values that miss.

The pilot threads can be considered as intended to provoke inevitable cache misses which will arise due to execution of the threads within the predetermined logical sequence, but to trigger these cache misses early such that the majority of the threads which will need the data associated with those cache misses will not be stalled (or stalled for a shorter time) waiting the return of that data as it will already have been fetched (or have been started to be fetched) as a consequence of the early execution of the pilot thread. This reordering of the threads from the predetermined logical sequence into the pilot sequence and the main sequence takes place without the need for modification of program instructions executing or upstream hardware systems which create the threads. Furthermore, the early processing and stalling of the pilot threads is not speculative as those threads are required to be executed and would have resulted in a cache miss. Rather, the reordering of the threads has moved the pilot threads earlier in execution so as to facilitate the execution of following main threads without (or with less) stalling.

In some embodiments the predetermined logical sequence may comprise a sequence of groups of threads in which each group of threads comprises a plurality of threads adjacent within the predetermined logical sequence. Division of the predetermined logical sequence into groups matches many real life processing workloads in which groups of threads have a tendency to access data values which are located proximal to each other within the memory address space.

In the context of threads arranged into groups, in some embodiments the pilot sequence and the main sequence may be timed relative to each other such that the next pilot thread to be issued in accordance with the pilot sequence is in a group at least one group ahead of the next main thread to be issued in accordance with the main sequence. Thus, pilot threads are at least one group ahead of the main threads and accordingly will provoke cache misses which will fill the cache memory with data which can then be consumed by the later main threads without cache misses arising. This effectively hides the cache fill latency for the main threads.

In some systems the pilot sequence may extend through a plurality of pilot groups ahead of the next main thread with decreasing numbers of pilot threads within each group as the issue time moves further ahead of the main thread issue time. This arrangement may be useful in increasing the efficiency of execution of the pilot threads themselves. Particularly early pilot threads may trigger cache misses, translation look aside buffer updates, first level memory accesses etc, which will then be used by the subsequent pilot threads. The subsequent pilot threads then trigger their own individual cache misses to return data values which are to be used by the main threads.

In some embodiments, each group of threads may be associated with a block of pixel values within an image and each thread within a group may correspond to processing associated with a pixel value within the block of pixels. The thread may correspond to a fragment to be determined in respect of a pixel, such as a transparency value, depth, colour, etc which will ultimately contribute to the final pixel value to be generated within an image.

Within the main sequence it is normal to use an interleaved scan pattern for each block of pixel values as in many cases this is an efficient way of traversing the data to be processed.

The pilot sequence may be selected to have one of a variety of different forms. Some forms are better matched to given patterns of data value accesses to be made within the main memory address space than others. It is desirable that the pilot sequence should be one which would trigger required cache fill operations in a wide variety of circumstances independent of the particular block of pixel values being processed and what it represents. Examples of pilot sequences which may be used include:
  (i) a diagonal line through each said block of pixels;
  (ii) a line parallel to one of a row direction and a column direction within each said block of pixels;
  (iii) clusters of one or more pixels disposed at predetermined positions within an array of possible cluster positions within each said block of pixels, said array of cluster positions comprising cluster lines of adjacent cluster position disposed parallel to one of a row direction and a column direction of said block of pixels, said array divisible into a plurality of adjacent parallel lines of cluster positions such that (a) within a given line each cluster is separated by three vacant cluster positions from any other nearest neighbour cluster within said given line and (b) each cluster in a neighbouring line adjacent said given line is positioned equidistant from any nearest neighbour cluster in said given line; and
  (iv) clusters of one or more pixels disposed at predetermined positions within an array of possible cluster positions within each said block of pixels, said clusters disposed within said array of cluster positions such that no cluster shares a cluster row, a cluster column or a cluster diagonal within said array of cluster positions.

As previously mentioned, each group of threads may correspond to the partial calculation of values needed to generate a block of pixels. A group of threads may correspond to a layer within a plurality of layers for processing that generates the block of pixel values.

The use of pilot threads ahead of the main thread to trigger early cache misses may be used independently of the grouping of threads and the association of groups of threads with blocks of pixels. In such general circumstances, the pilot threads need not be evenly distributed in time ahead of the main thread and may be arranged such that as time separation from the main thread issue time increases, the density of the pilot threads decreases such that a small number of pilot threads are issued very early and then these are followed by a larger number of pilot threads which are closer to the issue point in the main sequence of threads.

The issue controller may store issue queue data identifying the plurality of threads waiting within an issue queue to be executed and select threads for execution following both the main sequence and the pilot sequence in accordance with this issue queue data. At each time, a single thread may be selected for issue to the processing pipeline selected from either the main sequence or the pilot sequence. The main sequence is followed in order and the pilot sequence is followed in order. The overall order is different from the predetermined logical sequence.

In some embodiments the issue queue data will identify threads within the pilot sequence as having a high priority and threads within a main sequence as having a low priority. Furthermore, threads may be added to the issue queue in the predetermined logical sequence and the issue queue may identify a time in which each thread is added to the issue queue.

Using a combination of time information and priority information within the issue queue data, the issue controller may select a next thread to issue in accordance with a hierarchy in which an oldest low priority thread exceeding a threshold waiting time in the issue queue is selected first, if present, followed by an oldest high priority thread waiting in the issue queue if less than a target number of high priority threads are currently in execution by the processing pipeline, if any, followed by an oldest low priority thread. Selecting in accordance with these rules has the effect of ensuring that not too many high priority threads are in progress simultaneously in a manner which would cause an excess to become stalled and also that the main thread execution point does not drop too far behind the pilot thread execution point.

In some embodiments the target number of high priority threads to be kept in execution at any given time may be software programmable so as to match the particular data workload being executed at that time or a particular memory latency of a particular implementation.

An apparatus for processing data comprises:
  processing pipeline means for executing in parallel a plurality of threads within a predetermined logical sequence of threads to be executed; and issue control means for issuing threads to said processing pipeline means for execution;

wherein said issue controller means selects threads from said predetermined logical sequence for issue in accordance with both:
(i) a pilot sequence being a proper subset of said predetermined logical sequence; and
(ii) a main sequence trailing said pilot sequence through said predetermined logical sequence by a delay time and comprising those threads of said predetermined logical sequence not within said pilot sequence.

A method of processing data comprises the steps of:

executing in parallel within a processing pipeline a plurality of threads within a predetermined logical sequence of threads to be executed; and selecting threads from said predetermined logical sequence for issue to said processing pipeline in accordance with both:
(i) a pilot sequence being a proper subset of said predetermined logical sequence; and
(ii) a main sequence trailing said pilot sequence through said predetermined logical sequence by a delay time and comprising those threads of said predetermined logical sequence not within said pilot sequence.

The above, and other objects, features and advantages of this disclosure will be apparent from the following detailed description of illustrative embodiments which is to be read in connection with the accompanying drawings.

DRAWINGS

Figure 2:
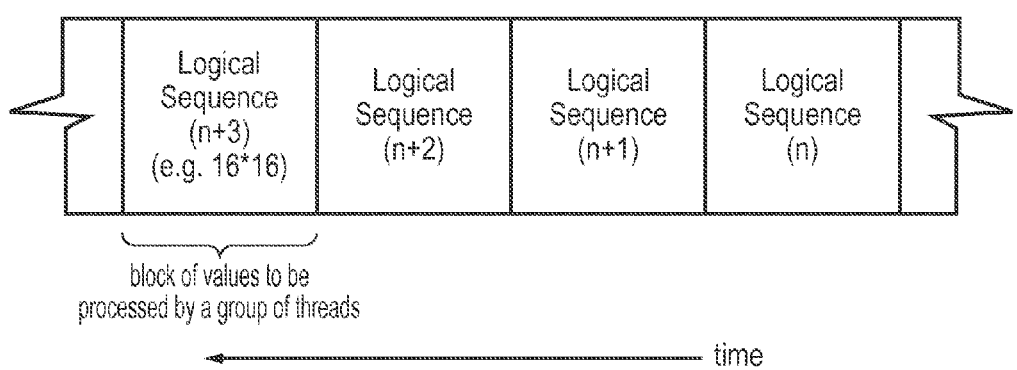
Figure 3:
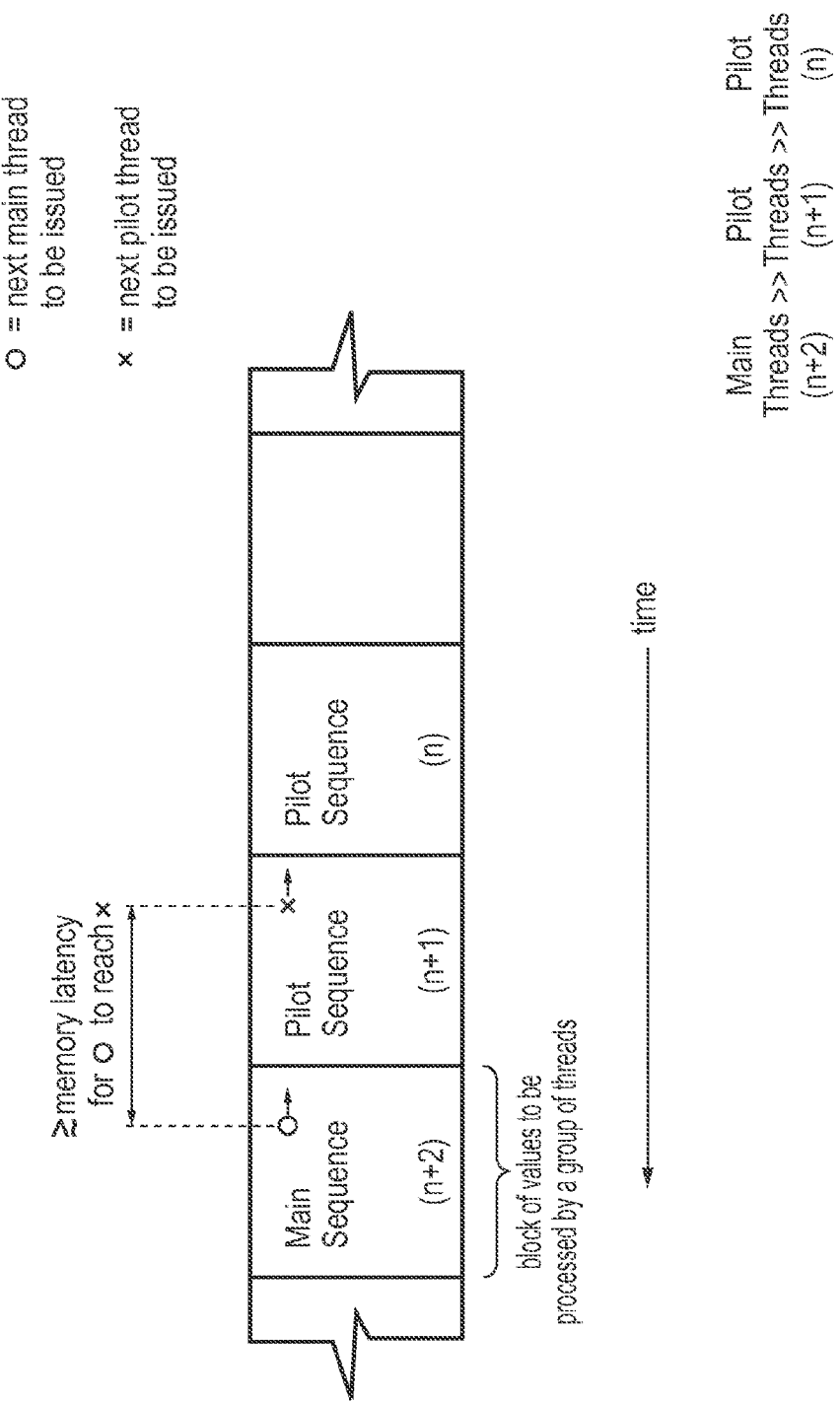
Figure 4:
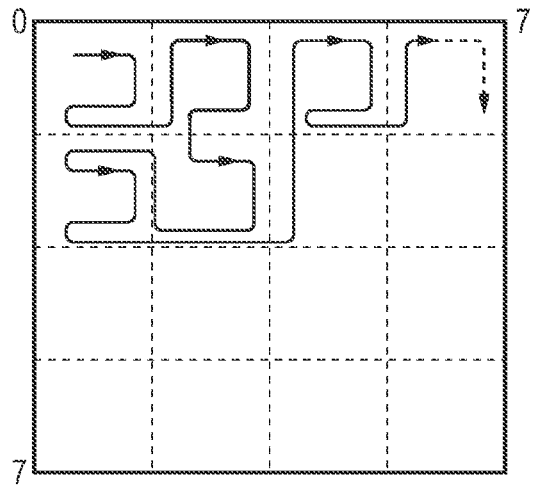
Figure 5:
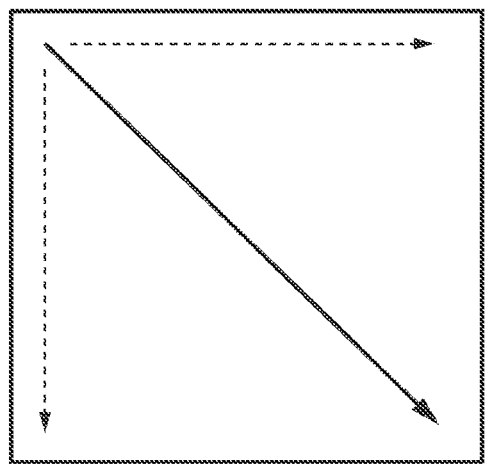
Figure 6:
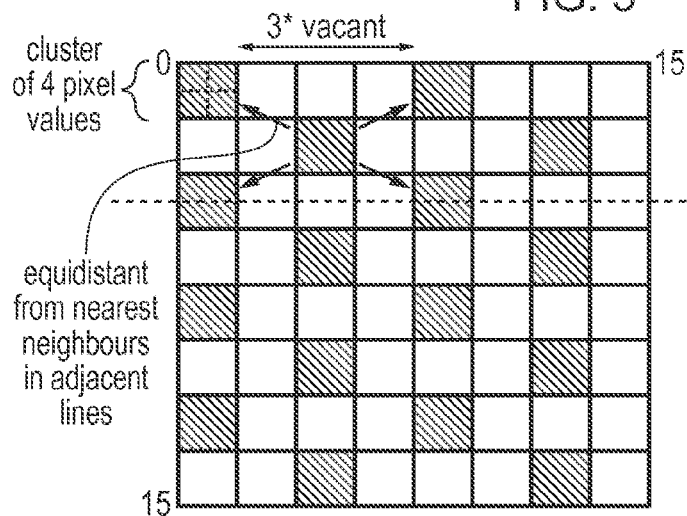
Figure 7:
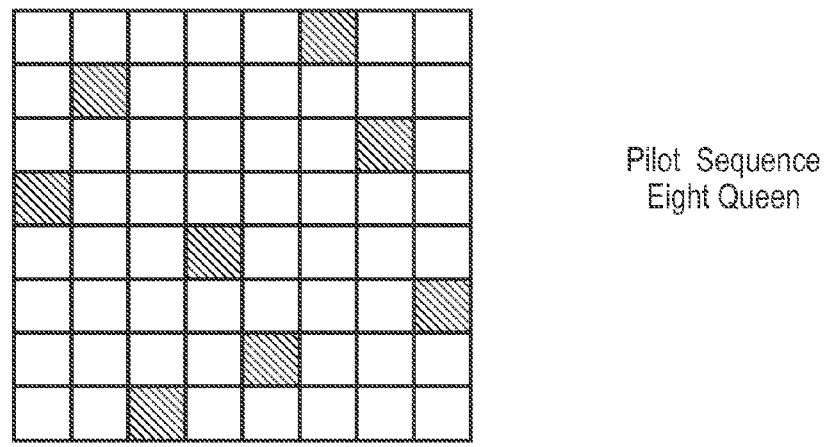
Figure 8:
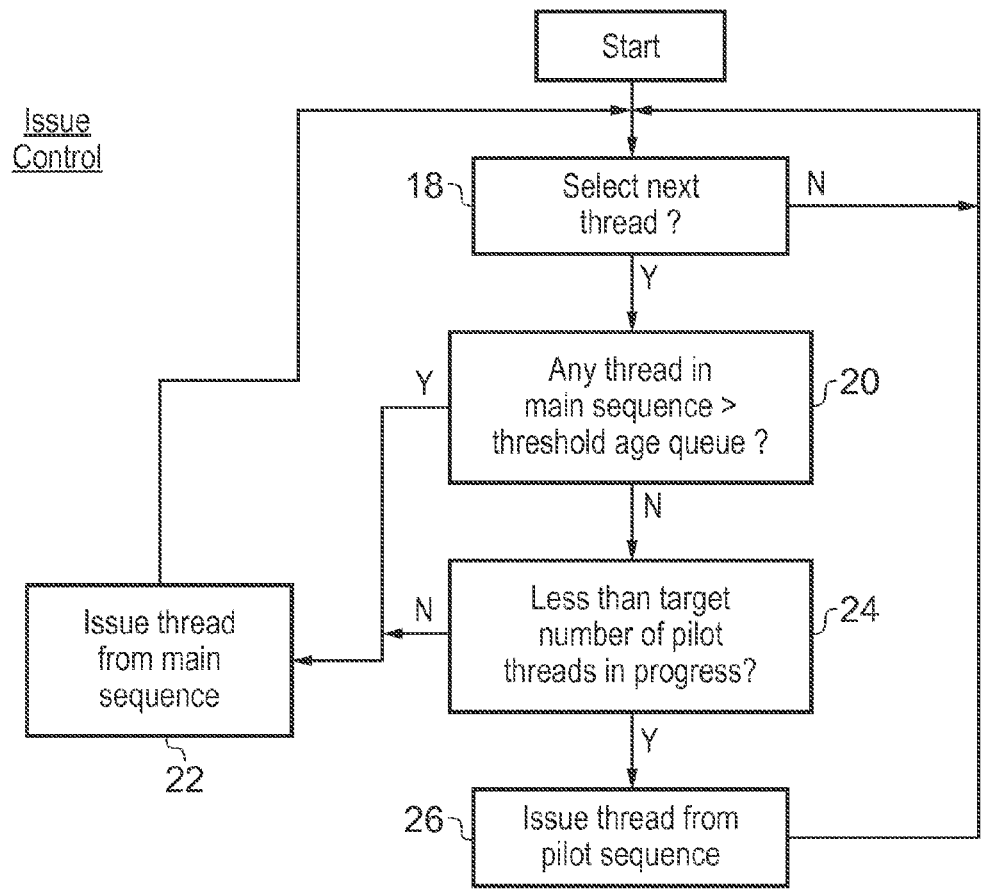

FIG. 1 schematically illustrates a data processing system including a processing pipeline and an issue controller for issuing threads in accordance with both a pilot sequence and a main sequence which differ from a predetermined logical sequence;

FIG. 2 schematically illustrates a predetermined logical sequence of thread issue;

FIG. 3 schematically illustrates issue in accordance with a pilot sequence and a main sequence;

FIG. 4 schematically illustrates an example of a main sequence order;

FIGS. 5, 6 and 7 schematically illustrate examples of pilot sequence orders; and FIG. 8 is a flow diagram schematically illustrating issue control.

EMBODIMENTS

FIG. 1 schematically illustrates a data processing system 2 including a graphics processing unit 4 and a main memory 6. The graphics processing unit 4 includes a processing pipeline 8, a cache memory 10, a stall manager 12 and an issue controller 14. It will be appreciated that in practice the graphics processing unit 4 will typically include many further data processing elements, such as those which create threads received by the issue controller 14 and queued therein prior to issue to the processing pipeline 8. Such additional circuit elements have been omitted from FIG. 1 for the sake of clarity. When a thread (e.g. a sequence of program instructions executing to generate a particular value, such as a particular pixel fragment within an array of pixels) executing within the processing pipeline 8 accesses a data value, then a check is made as to whether or not that data value is held within the cache memory 10. If the data value is not held within the cache memory 10, then a cache miss arises and a cache line including that data value is fetched from the main memory 6 to the cache memory 10. This fetch from the main memory 6 is relatively slow and has a memory latency time associated with it which may be several hundred times greater than the time normally taken to access a data value within the cache memory 10. A thread will circulate within the processing pipeline 8 with its successive instructions being executed until the thread has finished at which point it will be retired from the processing pipeline 8 freeing up a slot into which another thread may be issued.

The processing pipeline 8 executes a plurality of threads in parallel. The threads are issued into the processing pipeline 8 by the issue controller 14 in dependence upon issue queue data 16 (priority values, time stamps etc) associated with the queued threads. The issue controller 14 receives the threads in the predetermined logical sequence in which they are generated by the software and/or upstream hardware. The issue controller 14 issues the threads to the processing pipeline 8 following both a main sequence and pilot sequence. Threads are selected from the main sequence in the main sequence order. Threads are selected from the pilot sequence in the pilot sequence order. Selection as to whether the next thread to be issued should be taken from the main sequence or the pilot sequence is made in accordance with the issue queue data 16 as will be described later. The issue controller 14 may be considered to hold two queues, namely a pilot sequence queue and a main sequence queue. Threads are issued from each of these queues in their respective order, and a selection is made as to from which queue the next thread is to be issued in dependence upon the issue queue data 16. The issue queue(s) may be provided for other reasons in addition to the above (e.g. forward pixel kill) and so support for the present techniques may be added with little extra overhead.

When a thread is progressing along the processing pipeline 8 and a cache miss occurs, then the stall manager 12 coupled to the processing pipeline 8 serves to stall that thread until the data value which missed has been fetched to the cache memory 10 whereupon the thread is unstalled. The thread (or at least the relevant stalled instruction of the thread) may be recirculated within the pipeline 8 while it is stalled and its partial processing state retained.

FIG. 2 schematically illustrates the predetermined logical sequence in which threads are generated and received by the issue controller 14. In this example, the threads are formed into a sequence of groups of threads which each groups of threads corresponding to a group of pixels (e.g. 16* 16) to be processed. As illustrated, the block "n" is encountered first within the logical sequence and is then followed by blocks "n+1", "n+2" and "n+3". Each of the groups of threads (one thread per position) corresponds to a block of values to be processed so as, for example, to form a layer associated with a block of pixels within an image to be generated. Each thread may effectively calculate a fragment contributing towards a pixel value to be in the block of pixels concerned. The predetermined logical sequence corresponds to threads which are to be executed. Within the predetermined logical sequence illustrated in FIG. 2, the group "n" will be logically intended to be issued to the processing pipeline 8 earliest.

FIG. 3 schematically illustrates groups (blocks) of threads corresponding to those illustrated in FIG. 2 but in this case with threads being issued both in accordance with a pilot sequence and a main sequence. In the example illustrated, the current next thread issue point within the pilot sequence is marked with an "x". The current next thread issue point from within the main sequence is marked with an "o". As illustrated, the pilot sequence extends more than one group ahead of the current next thread issue point of the main sequence. As the separation in time ahead of the main sequence thread issue point increases, then the temporal spacing between threads which form part of the pilot sequence also increases. Accordingly, there are many more main threads to be issued from block "n+2" than there are pilot threads within block "n+1" and in turn many more pilot threads within block "n+1" than within block "n". The time gap between a given thread within the pilot sequence being issued and one of its neighbours within the logical sequence being issued as part of a main sequence is at least equal to the memory latency associated with a cache miss and preferably exceeds this time.

FIG. 4 schematically illustrates an interleaved main sequence in which main sequence threads are issued. It will be appreciated that some threads within the path illustrated in FIG. 4 which already have been issued as part of the pilot sequence will be omitted from the main sequence. Accordingly the main sequence can be considered to the remainder of the predetermined logical sequence which have not already been issued as part of the pilot sequence.

FIG. 5 schematically illustrates a diagonal pilot sequence within a group of threads corresponding to a block of pixels. Such a diagonal path of the pilot sequence through the threads when these are considered in their spatial position corresponding to the block of pixels has the result that one thread corresponding to each row and each column is included within the pilot sequence and accordingly will trigger any necessary cache miss for data values associated with the surrounding pixels.

Other possible pilot sequences include a horizontal pilot sequence and a vertical pilot sequence as illustrated by the dashed lines in FIG. 5. Such horizontal and vertical pilot sequences may be suitable for some layouts of the data values within the memory address space, but not for others. Accordingly, for example, a vertical pilot sequence suitable for accessing one data value within each row of a sequence of data values set out in a horizontal raster scan order within the memory address space, would not be suitable if that image was rotated through 90 degrees such that the vertical pilot sequence then served to access data values within a single horizontal raster line as the data values are arranged within the memory address space.

FIG. 6 illustrates another example of a pilot sequence, in this case a tiled sequence. As will be seen, each horizontal row within the pilot sequence contains two pilot threads with three vacant spaces therebetween. The pilot threads within adjacent rows are equidistant from the pilot threads within their neighbour rows. Also illustrated in FIG. 6 is the idea of a cluster of pixels. In practice, threads can be issued in clusters corresponding to a cluster of four pixel values. These clusters of threads have corresponding cluster positions which may be arranged in lines corresponding to one of the rows or columns through the array of cluster positions.

It will be appreciated that the pattern of pilot threads illustrated in FIG. 6 provides good coverage spatially distributed across the group of threads. The particular order with which the pilot threads may be issued out of this pattern may vary whilst still giving the appropriate coverage. In practice, there may be a preference for issuing the pilot threads out of the pilot sequence positions illustrated in FIG. 6 to correspond roughly to the order in which the main threads will be issued out of the main sequence so as to increase the spacing in time of a pilot thread from its neighbours within the main sequence.

FIG. 7 illustrates another pilot sequence. This pilot sequence corresponds to a solution of the eight queens problem from the field of chess. The eight queens problem is how to position eight queens on a chess board so that it shares neither a row, column nor diagonal with any other queen. The eight queens problem is analogous to the problem of triggering earlier prefetches with the pilot sequence as it is desired to select the pilot threads forming part of the pilot sequence such that they provide good coverage among the different rows, columns and diagonals within the array of threads (pixels), but without unwanted redundancy.

FIG. 8 is a flow diagram schematically illustrating operation of the issue controller 14 in controlling which thread to issue next. At step 18, processing waits until there is a slot available at the head of the processing pipeline 8 into which a thread may be issued (e.g. an existing thread is retired). Step 20 then determines whether there is any thread in the main sequence which greater than a threshold age. This threshold age corresponds to a delay since that thread was added to the issue queue. Main sequence threads are given priority for issue if they are older than this threshold age. If there are any main sequence threads greater than the threshold age, then step 22 selects the oldest of these for issue from the main sequence.

If a determination at step 20 is that there are no such main sequence threads, then step 24 determines whether there are currently less than a target number of pilot threads in progress within the processing pipeline 8. If there are less than this target number of threads, then step 26 serves to issue a thread from the pilot sequence as the next thread.

If there are not less than this target number of threads, then processing again proceeds to step 22 where an oldest main sequence thread is issued. The processing illustrated in FIG. 8 implements an issue hierarchy in which main sequence threads are given priority if they are greater than a threshold age. Following this, pilot threads are given priority if less than a target number of pilot threads are currently in execution. Following this, the oldest main sequence thread is given priority.

The issue queue data 16 held by the issue controller 14 includes priority data indicating whether a given thread is a high priority thread (pilot sequence) or a low priority thread (main sequence). In addition, time data is associated with each thread indicating the time at which it was added to the queues of threads awaiting issue by the issue controller 14. In practice, the issue controller 14 can be considered to maintain both a high priority pilot thread queue and a low priority main thread queue. A software programmable target number of a high priority threads to be kept in execution within the processing pipeline 8 is input to the issue controller 14. For example, this target number of threads may be 16, 32 or 48 depending upon circumstances and when using, for example, a processing pipeline capable of the parallel execution of 128 threads.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data comprising:
a processing pipeline configured to execute in parallel a plurality of non-speculative threads within a non-speculative predetermined logical sequence of non-speculative threads to be executed; and
an issue controller configured to issue non-speculative threads to said processing pipeline for execution;
wherein said issue controller is configured to select non-speculative threads from said non-speculative predetermined logical sequence for issue in accordance with both:
(i) a pilot non-speculative thread sequence being a proper subset of said non-speculative predetermined logical sequence; and
(ii) a main non-speculative thread sequence trailing said pilot sequence through said non-speculative predetermined logical sequence by a delay time and comprising those non-speculative threads of said non-speculative predetermined logical sequence not within said pilot non-speculative thread sequence.

2. Apparatus as claimed in claim 1, comprising:
a cache memory coupled to said processing pipeline and configured to store data values fetched from a main memory, a cache miss within said cache memory triggering a fetch operation lasting a latency time to fetch a data value from said main memory to said cache memory; and
a stall manager coupled to said processing pipeline and configured to stall a given processing thread executing in said processing pipeline upon detection of a miss within said cache memory for a data value to be accessed by said given thread and to unstall said given thread when said data value has been fetched to said cache memory.

3. Apparatus as claimed in claim 2, wherein said delay time is greater than or equal to said latency time.

4. Apparatus as claimed in claim 1, wherein
said non-speculative predetermined logical sequence comprises a sequence of groups of non-speculative threads, each said group of non-speculative threads comprising a plurality of non-speculative threads adjacent within said non-speculative predetermined logical sequence.

5. Apparatus as claimed in claim 4, wherein
said issue controller selects non-speculative threads to issue from said pilot non-speculative thread sequence and said main non-speculative thread sequence such that a next pilot non-speculative thread to be issued in accordance with said pilot non-speculative thread sequence is within a group of non-speculative threads at least one pilot group ahead of a next main non-speculative thread to be issued in accordance with said main non-speculative thread sequence.

6. Apparatus as claimed in claim 5, wherein said pilot non-speculative thread sequence extends through a plurality of pilot non-speculative thread groups ahead of said next main non-speculative thread, a number of pilot non-speculative threads within each of said plurality of pilot non-speculative thread groups ahead of said next main non-speculative thread reducing as separation from said next main non-speculative thread increases.

7. Apparatus as claimed in claim 4, wherein each group of non-speculative threads is associated with a block of pixel values within an image and each of said non-speculative threads within a group of non-speculative threads corresponds to processing associated with a pixel value within said block of pixel values.

8. Apparatus as claimed in claim 7, wherein said main non-speculative thread sequence corresponds to an interleaved scan pattern through each block of pixel values.

9. Apparatus as claimed in claim 7, wherein said pilot non-speculative thread sequence corresponds to one of:
(i) a diagonal line through each said block of pixels;
(ii) a line parallel to one of a row direction and a column direction within each said block of pixels;
(iii) clusters of one or more pixels disposed at predetermined positions within an array of possible cluster positions within each said block of pixels, said array of cluster positions comprising cluster lines of adjacent cluster position disposed parallel to one of a row direction and a column direction of said block of pixels, said array divisible into a plurality of adjacent parallel lines of cluster positions such that (a) within a given line each cluster is separated by three vacant cluster positions from any other nearest neighbor cluster within said given line and (b) each cluster in a neighboring line adjacent said given line is positioned equidistant from any nearest neighbor cluster in said given line; and
(iv) clusters of one or more pixels disposed at predetermined positions within an array of possible cluster positions within each said block of pixels, said clusters disposed within said array of cluster positions such that no cluster shares a cluster row, a cluster column or a cluster diagonal within said array of cluster positions.

10. Apparatus as claimed in claim 7, wherein each group of non-speculative threads corresponds to a layer within a plurality of layers of processing that generate said block of pixel values.

11. Apparatus as claimed in claim 1, wherein said pilot non-speculative thread sequence extends through said non-speculative predetermined logical sequence ahead of a next main non-speculative thread to be issued in accordance with said main non-speculative thread sequence such that positions of pilot non-speculative threads within said non-speculative predetermined logical sequence increase in separation from each other as separation from said next main non-speculative thread increases.

12. Apparatus as claimed in claim 1, wherein said issue controller stores issue queue data identifying a plurality of non-speculative threads waiting within an issue queue to be executed and said issue controller selects non-speculative threads to issue for execution by said processing pipeline following said main non-speculative thread sequence and said pilot non-speculative thread sequence in accordance with said issue queue data.

13. Apparatus as claimed in claim 12, wherein said issue queue data identifies non-speculative threads within said pilot non-speculative thread sequence as having a high priority and non-speculative threads within said main non-speculative thread sequence as having low priority.

14. Apparatus as claimed in claim 13, wherein non-speculative threads are added to said issue queue in said non-speculative predetermined logical sequence and said issue queue data identifies a time at which a non-speculative thread was added to said issue queue.

15. Apparatus as claimed in claim 14, wherein said issue controller selects a next non-speculative thread to issue in accordance with a hierarchy comprising:
an oldest low priority non-speculative thread exceeding a threshold time waiting in said issue queue;

an oldest high priority non-speculative thread waiting in said issue queue if less than a target number of high priority non-speculative threads are in execution by said processing pipeline; and an oldest low priority non-speculative thread.

16. Apparatus as claimed in claim 15, wherein said target number is software programmable.

17. Apparatus for processing data comprising:

processing pipeline means for executing in parallel a plurality of non-speculative threads within a non-speculative predetermined logical sequence of non-speculative threads to be executed; and issue control means for issuing non-speculative threads to said processing pipeline means for execution;

wherein said issue controller means selects non-speculative threads from said non-speculative predetermined logical sequence for issue in accordance with both:
 (i) a pilot non-speculative thread sequence being a proper subset of said non-speculative predetermined logical sequence; and
 (ii) a main non-speculative thread sequence trailing said pilot non-speculative thread sequence through said non-speculative predetermined logical sequence by a delay time and comprising those non-speculative threads of said non-speculative predetermined logical sequence not within said pilot non-speculative thread sequence.

18. A method of processing data comprising the steps of:

executing in parallel within a processing pipeline a plurality of non-speculative threads within a non-speculative predetermined logical sequence of non-speculative threads to be executed; and selecting non-speculative threads from said non-speculative predetermined logical sequence for issue to said processing pipeline in accordance with both:
 (i) a pilot non-speculative thread sequence being a proper subset of said non-speculative predetermined logical sequence; and
 (ii) a main non-speculative thread sequence trailing said pilot non-speculative thread sequence through said non-speculative predetermined logical sequence by a delay time and comprising those non-speculative threads of said non-speculative predetermined logical sequence not within said pilot non-speculative thread sequence.

19. Apparatus for processing data comprising:

a processing pipeline configured to execute in parallel a plurality of threads within a predetermined logical sequence of threads to be executed; and an issue controller configured to issue threads to said processing pipeline for execution;

wherein said issue controller is configured to select threads from said predetermined logical sequence for issue in accordance with both:
 (i) a pilot sequence being a proper subset of said predetermined logical sequence; and
 (ii) a main sequence trailing said pilot sequence through said predetermined logical sequence by a delay time and comprising those threads of said predetermined logical sequence not within said pilot sequence, and wherein said pilot sequence extends through said predetermined logical sequence ahead of a next main thread to be issued in accordance with said main sequence such that positions of pilot threads within said predetermined logical sequence increase in separation from each other as separation from said next main thread increases.

* * * * *